No. 887,710. PATENTED MAY 12, 1908.
A. THOMAS.
METALLIC REINFORCEMENT OF CONCRETE.
APPLICATION FILED JAN. 28, 1907.
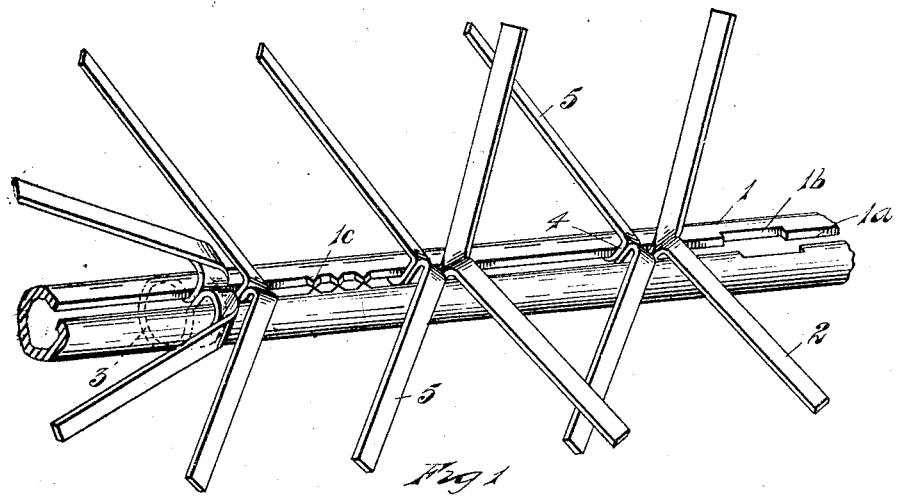
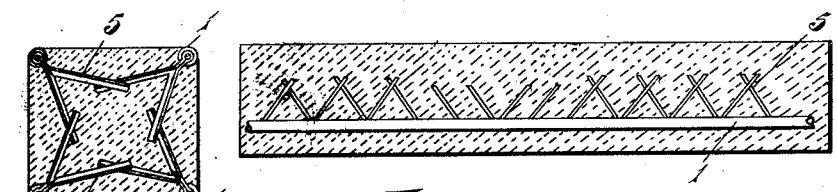
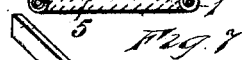
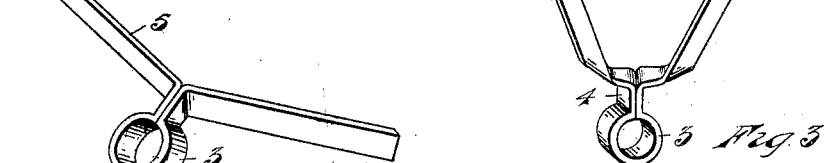
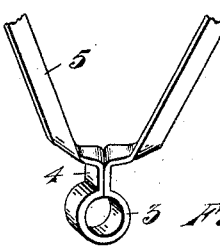
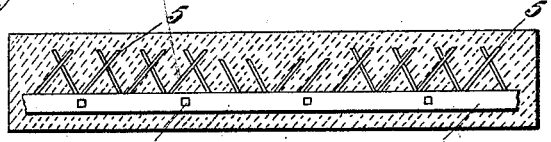
WITNESSES
C. E. Day
Lotta Lee Hayton.
INVENTOR
Avila Thomas
By Parker & Burton Attorneys.

UNITED STATES PATENT OFFICE.

AVILA THOMAS, OF DETROIT, MICHIGAN, ASSIGNOR OF ONE-HALF TO EUGENE F. GLOCK, OF DETROIT, MICHIGAN.

METALLIC REINFORCEMENT OF CONCRETE.

No. 887,710.

Specification of Letters Patent.

Patented May 12, 1908.

Application filed January 28, 1907. Serial No. 354,385.

*To all whom it may concern:*

Be it known that I, AVILA THOMAS, who am a subject of the King of Great Britain and Ireland, residing at Detroit, county of Wayne, State of Michigan, have invented a certain new and useful Improvement in Metallic Reinforcement of Concrete, and declare the following to be a full, clear, and exact description of the same, such as will enable others skilled in the art to which it pertains to make and use the same, reference being had to the accompanying drawings, which form a part of this specification.

This invention relates to the metallic reinforcement of concrete, and has for its object certain improvements in the direction of lightness and strength of material, and consequent decreased cost of construction, over the structure shown in Letters Patent of the United States Number 827,892 issued to me on August 7, 1906, for improvements in this art. The structure therein disclosed contemplated uniformly a solid, or seamless, tubular, longitudinal bar, about which engaged the desired number of reinforcing sheet metal pieces, whose central body portions encircled the bar, and which were held from improper displacement by their peculiarly binding contact parts which engaged the tie rod. And since the strain upon the longitudinal rod is very largely done away with by the use of the small reinforcing pieces, I have found that for many constructions a tubular tie rod possesses sufficient strength, and certain advantages in the way of assembling which will be hereinafter pointed out.

In the drawings:—Figure 1, is a perspective, showing a section of tie rod, with sheet metal reinforcing members inserted therein. Fig. 2 is a longitudinal section, showing the rod, sheet metal members, and the inclosing concrete body. Figs. 3 and 4, are detail perspectives of the two forms of reinforcing members shown in position in Fig. 1. Fig. 5, is an elevation of a reinforcing piece in position with respect to a modified form of longitudinal bar, which is shown in cross section. Fig. 6, is a side elevation of this type of reinforcing member, and its sheet metal pieces, the surrounding concrete being shown in section. Fig. 7, is a cross section of a column wherein each corner is formed by the closed portion of a longitudinal bar, whose reinforcing members extend into the concrete, as shown. Fig. 8, is a similar cross section with the longitudinal bars wholly inclosed by, and beneath the surface of, the concrete. Fig. 9, is a detail perspective of a reinforcing member bent into form from wire, in place of the sheet metal type illustrated in Figs. 3 and 4.

1 represents the longitudinal bar in which there is a slit $1^a$, whose opposite edges are sufficiently spaced to permit the individual reinforcing pieces 2 to engage with their eye or body portions 3 closely within said tube, and with the neck portion 4 of each extending outside through the slit $1^a$, the arms 5 then radiating therefrom, as desired. After the desired number of these reinforcing pieces have been placed in position in the tube, and their position along its length determined upon, the tube may, by a sharp blow of a hammer, be sufficiently distorted on each side of each reinforcing piece so that it cannot, as formerly, slide freely along its length, but is held in the position desired, thereby being kept from rocking by the close fit of its eye portion 3 against the inner face of the tube. The rigidity of the reinforcing piece in its position with respect to the tube is insured by the fact that the body portion 3 is in effect a cylindrical piece of appreciable longitudinal extent along the inner face of the tubular longitudinal bar, and thus furnishes longitudinally spaced bearing planes, each, of course, bearing with equal accuracy against the complementary inner face of the longitudinal tubular bar 1. The component body portion of the beam cement or concrete being poured thereabout and allowed to harden, the tie rod and the individual reinforcing pieces become structurally integral with it, and the slit therein in the tie rod permits the flowing therethrough into that portion of the interior not occupied by the eye portions of the reinforcing pieces of the plastic cement, which, upon hardening, imparts increased rigidity to the tubular tie rod.

The advantage of the tubular tie rod is shown in another direction when its use in pillars is attempted, for, if, as is very desirable, the unbroken metal of the back or under side of the tie rod be desired as the corner piece of the pillar, leaving the arms of the individual reinforcing pieces to extend toward the center of the pillar, the corners of the finished pillar are perfectly smooth, whereas if reinforcing pieces of the type disclosed in my Letters Patent referred to were used wherever they occurred along the tie rod, the several bands or belts of metal constituting their body portion would show and cause an irregularity therein, and, as illustrated in Fig. 8, this use in columns is equally feasible where the longitudinal bars are, like the reinforcing members, kept wholly beneath the surface.

In Fig. 5, is shown a slight modification of the type of longitudinal bar, in that channel bars 10 of the ordinary commercial type are employed as equivalents of a completely splitted tube, their concaved portions being faced one to another, and drawn together as tightly as may be desired about the eye portion of a reinforcing piece by bolts 7.

The special type of reinforcing piece shown in Fig. 3, and at the extreme left of Fig. 1, is intended to carry its strain resisting arms to either side of, and as nearly as possible parallel with, the longitudinal tie bar, whereas the type shown in Fig. 4, and illustrated in the center and right hand portions of Fig. 1, and adapted specially to reach out as widely as possible from the tie bar to receive and transmit to it the strain from as large a section of the concrete as is possible.

It is obvious that reinforcing pieces of wire of the type illustrated in Fig. 9, could be substituted for those of sheet iron here illustrated, the positions assumed by the various lengths of wire to one another being relatively the same as the various edges of the sheet metal pieces here shown bear to one another.

The use of a bar whose slitted edges 1ª are notched or serrated as shown at 1ᵇ in Fig. 1 is sometimes desirable as a substitute for the distortion of a tube by hammer strokes for the firm locking of the reinforcing pieces 2 in position.

What I claim is:—

1. Means for reinforcing concrete, comprising a longitudinally extending tubular member slitted throughout its length, and individual reinforcing pieces supported thereby, each having a tubular body portion of complementary size and outline to the inside of said tubular member, engaging closely therewithin, and arm portions extending through the slit in said longitudinal tubular member and radiating therefrom at angles designed to locate them across the lines of strain passing through that portion of the structure, substantially as described.

2. In a concrete beam, in combination with a split tubular tie bar, a plurality of auxiliary members engaging with their complementary cylindrical body portions within and closely against the inner face of said tie bar and with their arm portions projecting through the slit and extending at angles to one another and to the tie rod.

3. Metallic reinforcement for concrete, having, in combination with a receiving member adapted to extend lengthwise of a concrete beam, an auxiliary bond member adapted to extend into said receiving member and engage with its tubular body portion closely against the complementary inner face of said member, the arm portions of said bond member extending without said receiving member and radiating therefrom at desired degrees of angularity, substantially as described.

4. Means for reinforcing concrete, comprising a longitudinally slitted tie bar, and reinforcing pieces having tubular body portions adapted to fit closely against the complementarily shaped interior of the tie bar engaging closely therewithin against a plurality of points of contact longitudinally spaced from one another with their arms projecting through said slitted portion and at angles to the tie bar, the edges of the tie bar adjacent to the slitted portion being adapted to be distorted on each side of a reinforcing piece after its insertion therein to prevent its subsequent unintended removal from its place along the tie bar, substantially as described.

In testimony whereof, I sign this specification in the presence of two witnesses.

AVILA THOMAS.

Witnesses:
LOTTA LEE HAYTON,
WILLIAM M. SWAN.